US012044395B2

(12) United States Patent
Mitchell et al.

(10) Patent No.: US 12,044,395 B2

(45) Date of Patent: Jul. 23, 2024

(54) ILLUMINATING DEVICE

(71) Applicants: April Mitchell, Cedar Point, NC (US); Matthew Andersen, Omaha, NE (US)

(72) Inventors: April Mitchell, Cedar Point, NC (US); Matthew Andersen, Omaha, NE (US)

(73) Assignees: April Mitchell, Cedar Point, NC (US); Matthew Andersen, Omaha, NE (US)

( * ) Notice: Subject to any disclaimer, the term of this patent is extended or adjusted under 35 U.S.C. 154(b) by 0 days.

(21) Appl. No.: 17/734,841

(22) Filed: May 2, 2022

(65) Prior Publication Data

US 2022/0349550 A1 Nov. 3, 2022

Related U.S. Application Data

(60) Provisional application No. 63/182,910, filed on May 1, 2021.

(51) Int. Cl.

| | |
|---|---|
| ***F21V 3/02*** | (2006.01) |
| ***A63H 27/10*** | (2006.01) |
| ***F21V 3/04*** | (2018.01) |

(52) U.S. Cl.

CPC ............. *F21V 3/026* (2013.01); *A63H 27/10* (2013.01); *F21V 3/049* (2013.01); *A63H 2027/1058* (2013.01)

(58) Field of Classification Search

CPC .......... F21S 10/00; F21V 3/026; F21V 3/049; A63H 27/10; A63H 2027/1058; F21Y 2115/30; F21W 2121/00; Y10S 362/806

See application file for complete search history.

(56) References Cited

U.S. PATENT DOCUMENTS

| | | | | |
|---|---|---|---|---|
| 9,683,730 | B1 * | 6/2017 | Redpath | F21V 9/30 |
| 10,160,551 | B2 * | 12/2018 | Hartman | B64D 47/02 |
| 2006/0291217 | A1 * | 12/2006 | Vanderschuit | F21V 3/023 362/363 |
| 2008/0175006 | A1 * | 7/2008 | Kellmann | F21S 9/037 362/363 |

* cited by examiner

*Primary Examiner* — Arman B Fallahkhair

(74) *Attorney, Agent, or Firm* — Suiter Swantz IP

(57) ABSTRACT

An illumination device may include, but is not limited to: a shell portion; and a light projection device disposed at least partially within the shell portion, the light projection device including: at least one light source operably couplable to a power source; and at least one diffraction grating configured to distribute a light beam generated by the at least one light source onto an interior surface of the shell portion.

6 Claims, 5 Drawing Sheets

ILLUMINATING DEVICE

PRIORITY

The present application claims priority under 35 U.S.C. § 119(e) to U.S. Provisional Patent Application Ser. No. 63/182,910, entitled LASER ILLUMINATED INFLATABLE, filed May 1, 2021, naming April Mitchell as inventor, which may be incorporated herein by reference in the entirety.

SUMMARY OF THE INVENTION

An illuminating device may include a light emitting device (e.g., a laser) disposed within an enclosed structure which may be inflatable (e.g., a balloon). The light emitting device may configured to project light on an interior surface of an inflatable structures to display illuminated designs which advertise a product, convey a message, or display a shape or design.

DETAILED DESCRIPTION

Figure 1A:
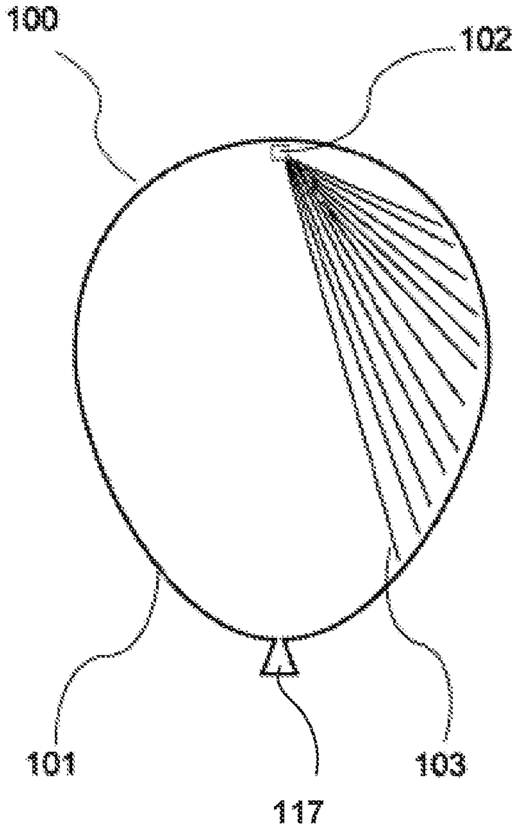
FIG. 1A—shows an internal cross sectional view of an illuminating device with outer shell.

The drawings and specific descriptions of the drawings, as well as any specific or alternative embodiments discussed, are intended to be read in conjunction with the entirety of this disclosure. The illuminating device may, however, be embodied in many different forms and should not be construed as being limited to the embodiments set forth herein; rather, these embodiments are provided by way of illustration only and so that this disclosure will be thorough, complete, and fully convey understanding to those skilled in the art.

Referring to FIGS. 1-5, an illuminating device 100 may include one or more of the following components: a shell portion 101 (e.g., an inflatable or inflated shell); at least one image projection unit 102 including a light source 104 (e.g., a laser diode), a diffraction grating 107, and a power source 110 (e.g., an internal battery pack or connection to an external power source such as a wall outlet or light bulb socket).

An illuminated image 116 visible on the shell portion 101 may be generated by diffracting a concentrated light beam 105 (e.g., a laser beam) into a lesser concentrated illuminated image 103 by diffracting single wavelength light waves from a light source 104. Furthermore, the diffraction grating 107 may be designed to provide a non-linear distribution of the light beam 105 that corresponds to a shape of the exterior shell portion 101 on which it may be projected. This correspondence may be defined by implementing a predetermined distribution designed in such a way that diffraction grating 107 having a varying focal length may be utilized to compose an appropriately adjusted image to substantially eliminate visual distortion that would normally occur when displayed on a curved surface of the shell portion 101.

In the case of use of a balloon-type shell portion 101, a closure 117 may be provided which prevents gas from escaping from the shell portion 101 after inflation. The closure 117 may be applied to a filling port 112 after gas may be used to expand the device to optimal size.

The image projection unit 102 may be internally mounted within the shell portion 101 via adhesion or other mechanical means. In one example, the image projection unit 102 may be mounted to a wall of the shell portion 101 with a rubber band 118 that binds a small portion 120 of the wall material of the shell portion 101 to a small protrusion 119 on the image projection unit 102. It should further be noted that the shell portion 101 may be semi-opaque in that an illuminated image 103 may be projected internally shell portion 101 via the diffracted light beam 105 but may be viewed on an external surface of the shell portion 101.

The shell portion 101 may be either manually filled (e.g., by blowing in air with a user's mouth, or placed on a gas distribution nozzle such as those found on electric inflation devices or helium tanks) or may be mechanically inflated with a blow molding machine. During the inflation process a release tab 109 blocking a battery connection 110 of the image projection unit 102 may automatically be removed from the battery connection 110 upon application of tension to the release tab 109 as the shell portion 101 increases in size. In another embodiment, the image projection unit 102 may be installed after the inflation process for the shell portion 101 is completed as in the case of blow molded embodiments. It should further be noted that an elastomeric balloon or a vinyl walled inflatable shell portion 101 or the like may be used to house the image projection unit 102 and display the illuminated image 103, including common toy balloons, shaped vinyl pool inflatables, and promotional advertising signs of various inflated shapes, and even thin walled toy balls. Blow molded embodiments may include a globe or other rigid shape which may be an integral component of a toy or other device, or may be a modular replaceable unit.

Figure 1B:
FIG. 1B—shows an external side view of an illuminating device with outer shell.

FIGS. 1A and 1B show internal and external views, respectively, of illuminating device 100 having shell portion 101. An image projection unit 102 may distribute light beam 105 onto an inner surface of the shell portion 101 forming an illuminated image 103 of a person visible from the outside of the shell portion 101.

Figure 2:
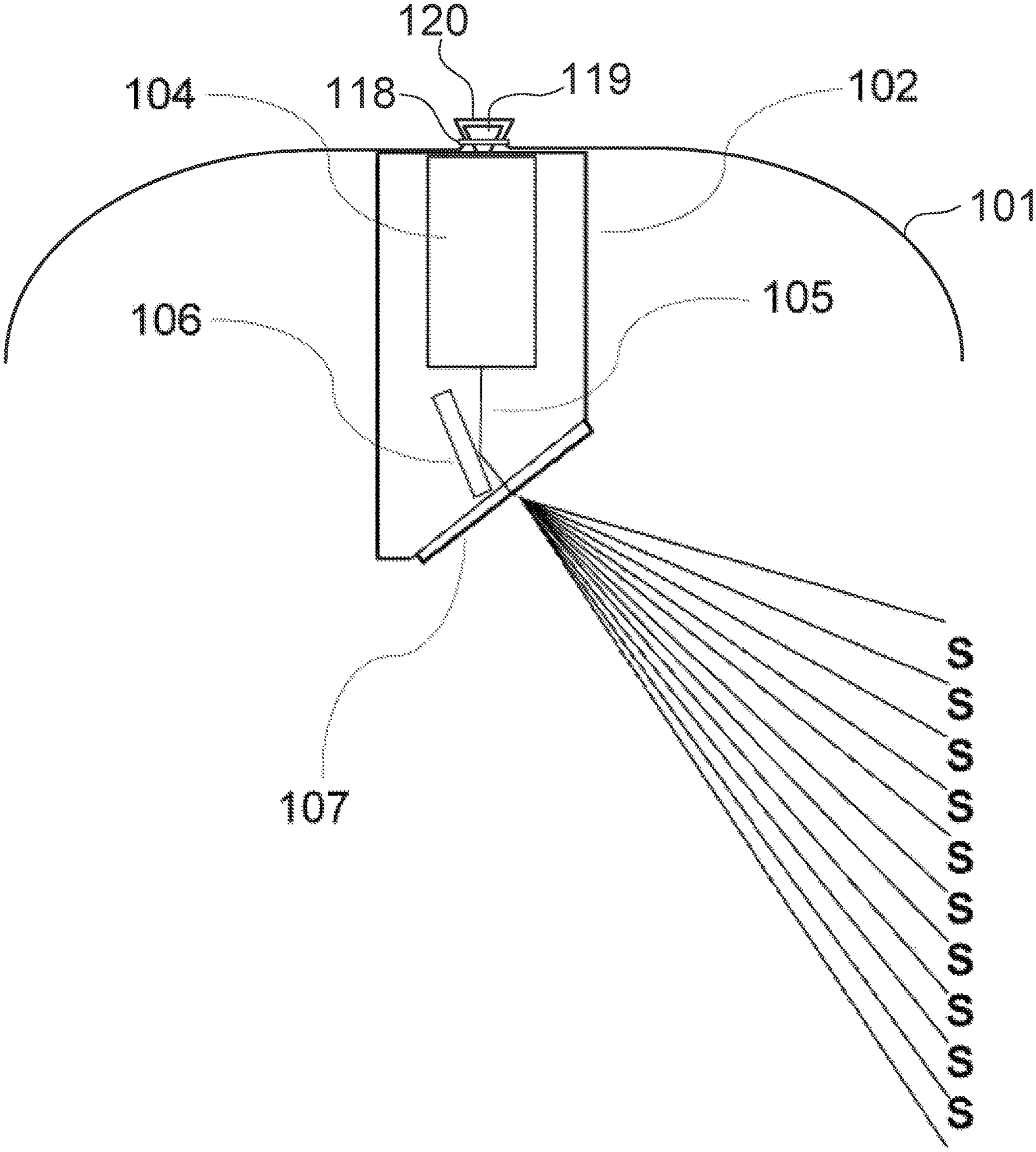
FIG. 2.—shows a closeup side view of an image projection unit.

FIG. 2 shows an image projection unit 102 containing a light source 104 (e.g., a laser source) which generates a concentrated light beam 105. A mirror 106 may be provided which is configured to reflect light beam 105 toward a diffraction grating 107 which may split and/or redirect the light beam 105 into a controlled distribution yielding uniform proportion "S" of separate elements of the projected illuminated image 103.

Figure 3:
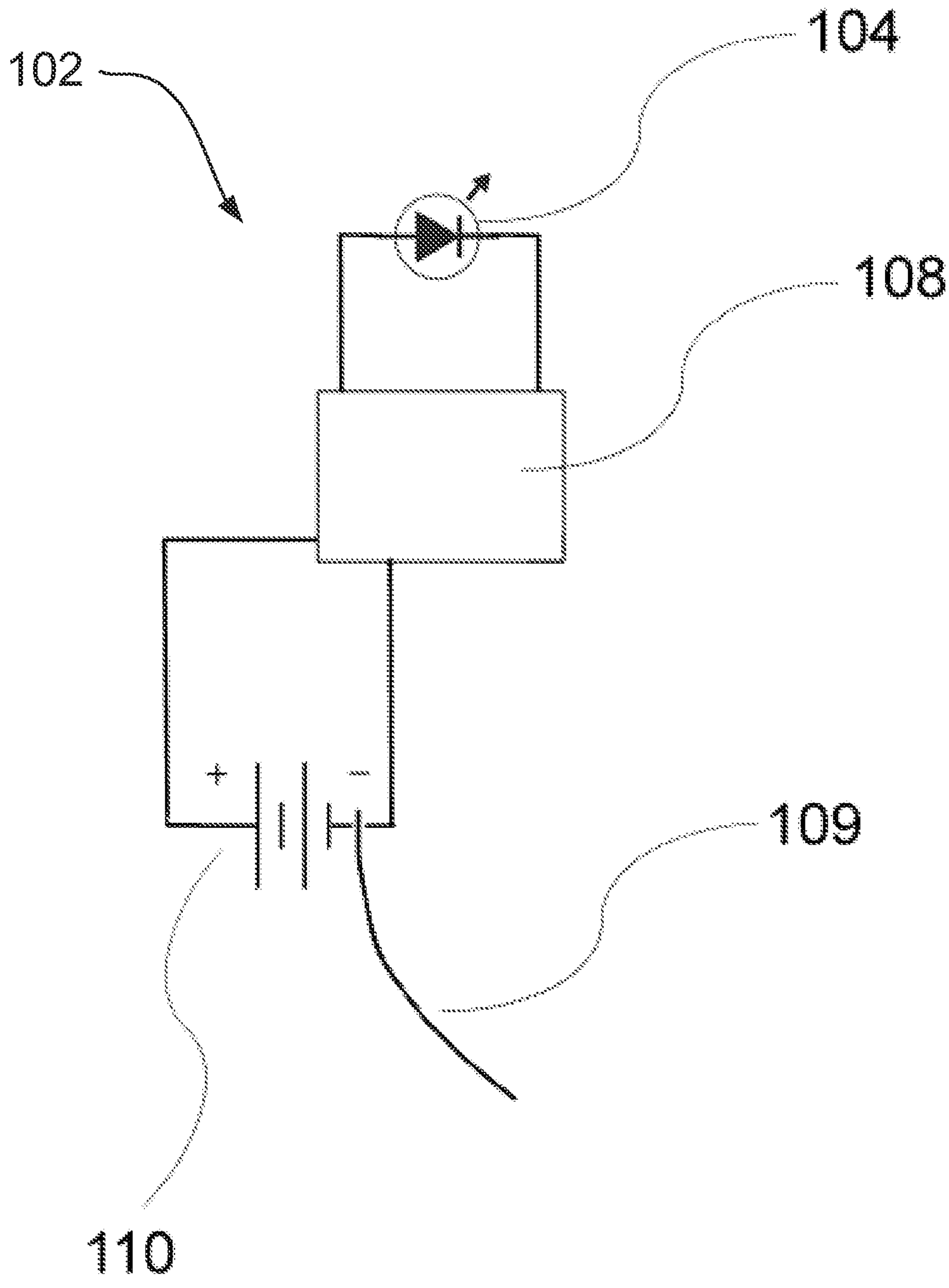
FIG. 3.—shows a normally-on electronic circuit with light source.

FIG. 3 shows a normally-on image projection unit 102 with light source 104 (e.g., a laser diode) driven by light source driver circuit 108. The power source 110 (e.g., a an on board battery or externally connected power source such as a power outlet or light bulb socket) may supply current to the driver circuit 108. A non-conductive release tab 109 may interrupt the driver circuit 108, thereby preventing the activation of light source 104 until the release tab 109 is be removed from the driver circuit 108.

Figure 4C:
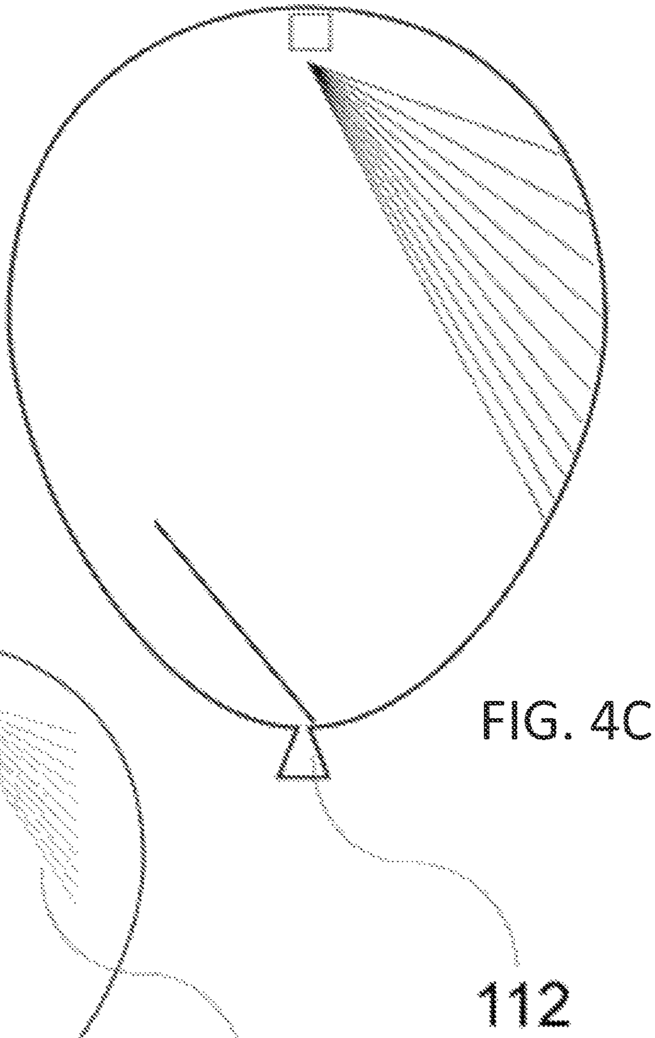
FIGS. 4A-4C.—show three progressive states of inflation of the illumination device.
Figure 4B:
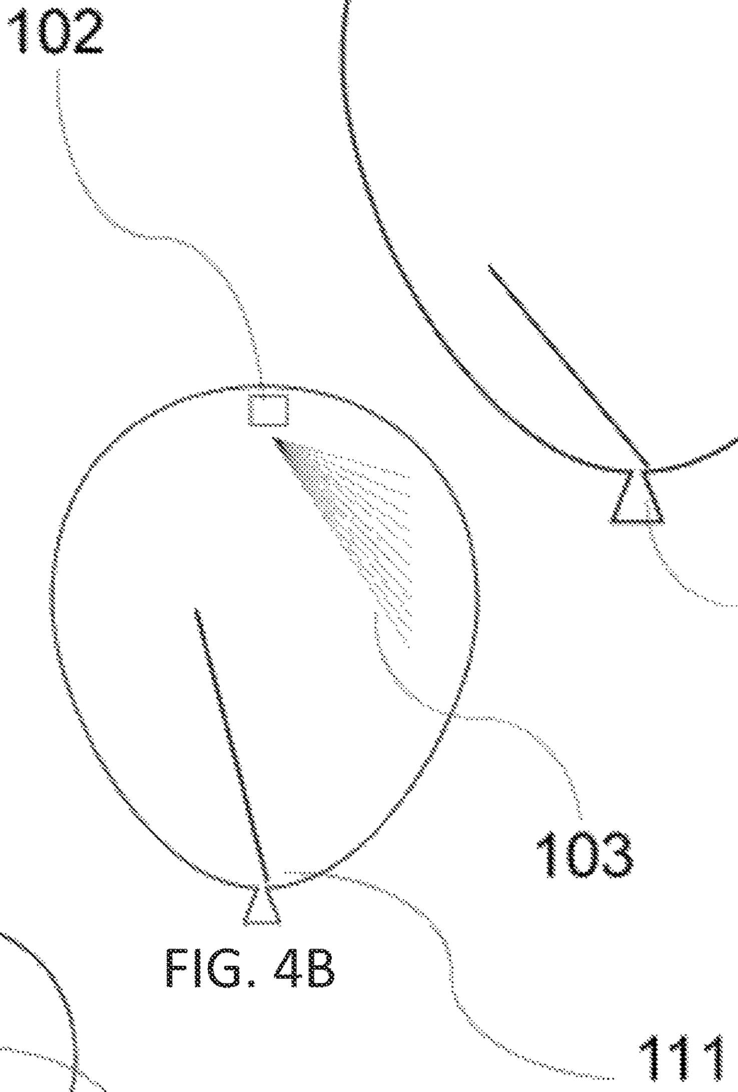
Figure 4A:
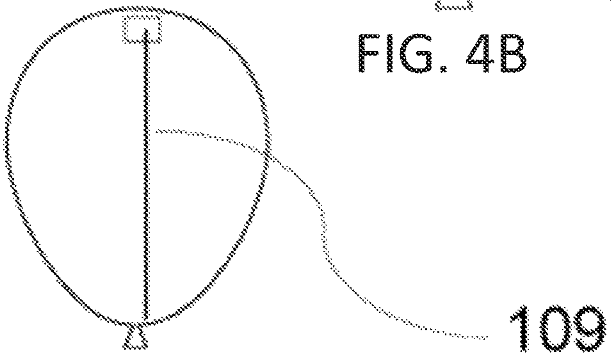

FIGS. 4A-4C depict progressive states of the illuminating device 100 ranging from un-inflated to fully-inflated. The release tab 109 is shown in the un-inflated device state of FIG. 4A as spanning a distance from the image projection unit 102 to the filling port 112. The semi-inflated device state of FIG. 4B shows the release tab 109 after release from the image projection unit 102 while still anchored to the shell portion 101 at contact location 111 and shows partial progress of the illuminated image 103. The fully inflated device state of FIG. 4C shows the complete distribution of the illuminated image 103 on the shell portion 101 while the release tab 109 has fallen aside.

Figure 5:
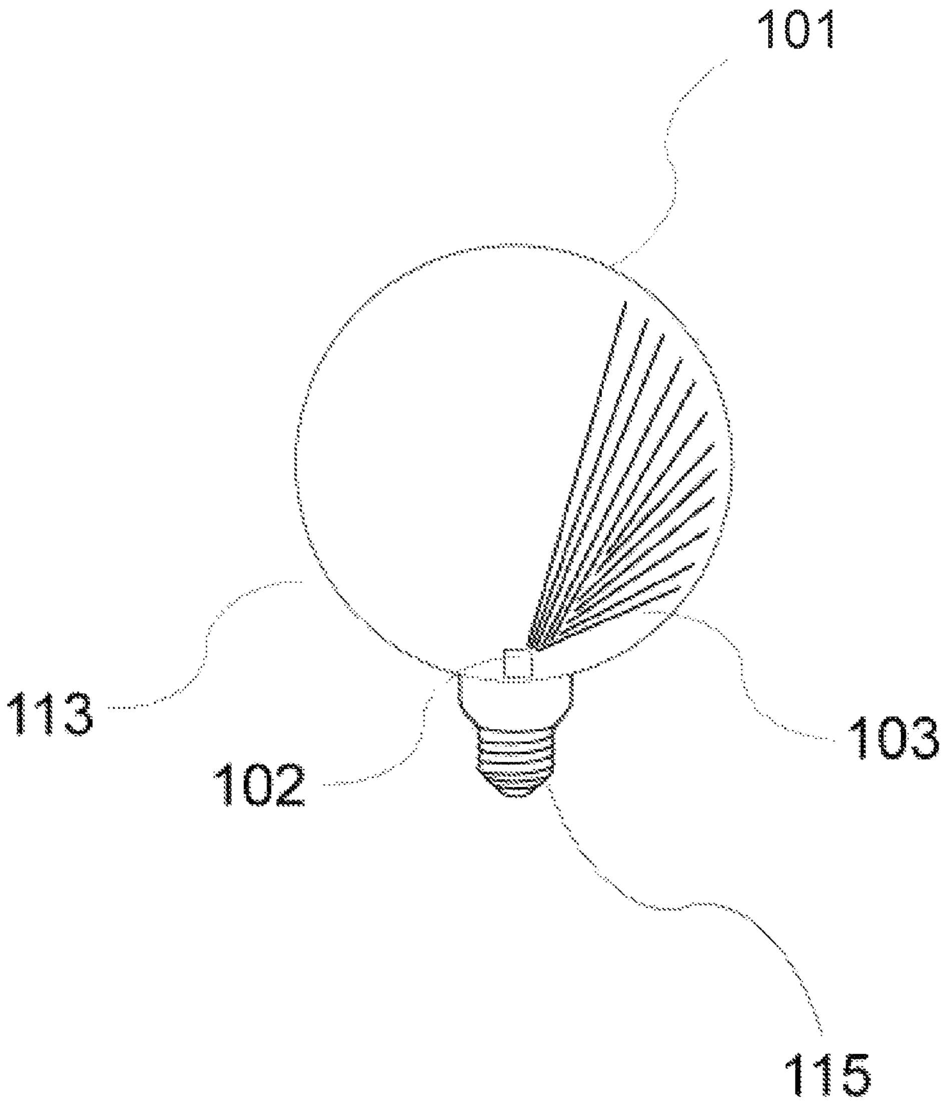
FIG. 5.—shows an illumination device having a blow molded outer shell.

FIG. 5 shows an embodiment of the illuminating device 100 having a rigid, blow molded shell portion 101. The illuminating device 100 may include a screw-in light bulb-type base 115 coupled with the shell portion 101 and providing a power connection for the image projection unit 102 to an external wired power supply (e.g. ornamental light strings or used as part of a toy). The illuminated image 103 may be projected by the image projection unit 102 onto the rigid, blow molded shell portion 101.

In an alternate embodiment, a light sensitive switch may be integrated into the image projection unit 102 for the purpose of deactivating the image projection unit 102 unit automatically during bright ambient light conditions.

Different features, variations and multiple different embodiments have been shown and described with various details. What has been described in this application at times in terms of specific embodiments may be done for illustrative purposes only and without the intent to limit or suggest that what has been conceived may be only one particular embodiment or specific embodiments. It may be to be understood that this disclosure may be not limited to any single specific embodiments or enumerated variations. Many modifications, variations and other embodiments will come to mind of those skilled in the art, and which are intended to be and are in fact covered by this disclosure. It may be indeed intended that the scope of this disclosure should be determined by a proper legal interpretation and construction of the disclosure, including equivalents, as understood by those of skill in the art relying upon the complete disclosure present at the time of filing.

What is claimed:

1. An illumination device comprising:

an elastomeric inflatable structure;

a light projection device disposed at least partially within the elastomeric inflatable structure, the light projection device including:

at least one light source operably couplable to a power source; and at least one diffraction grating lens disposed at least partially within the elastomeric inflatable structure in a light path of the at least one light source and having non-linearly distributed gratings that are configured to non-linearly distribute a light beam generated by the at least one light source onto an interior curved surface of the elastomeric inflatable structure to generate an image with substantially no distortion on the interior curved surface.

2. The illumination device of claim 1, wherein the at least one light source includes:

a laser light source.

3. The illumination device of claim 1, wherein the at least one diffraction grating lens includes:

at least one diffraction grating lens having an order of diffraction greater than or equal to zero.

4. The illumination device of claim 1, wherein the elastomeric inflatable structure is a balloon.

5. The illumination device of claim 1, further comprising:

a release tab including:

a non-conductive first end configured for insertion into a driver circuit of the power source; and a second end anchored to the interior surface of the elastomeric inflatable structure, wherein the release tab has a length configured such that the non-conductive first end of the release tab remains inserted into the driver circuit of the power source when the elastomeric inflatable structure is deflated and is withdrawn from the driver circuit of the power source when the elastomeric inflatable structure is inflated.

6. The illumination device of claim 1, further comprising:

a release tab including:

a non-conductive portion configured for insertion into a circuit so as to interrupt a supply of current from the power source to the light projection device; and a tether portion operably coupled to the non-conductive first end and configured to withdraw the non-conductive portion upon an application of tension to the tether portion.

* * * * *